May 17, 1955  A. BOSCHI  2,708,352
REGULATION OF THE PRECOMPRESSION ON TRANSMISSION
JOINTS WITH ELASTIC RUBBER ELEMENTS
Filed Aug. 27, 1951  2 Sheets-Sheet 1

INVENTOR
ANTONIO BOSCHI,

BY *Stone, Boyden & Mack*
ATTORNEYS.

May 17, 1955  A. BOSCHI  2,708,352
REGULATION OF THE PRECOMPRESSION ON TRANSMISSION
JOINTS WITH ELASTIC RUBBER ELEMENTS
Filed Aug. 27, 1951  2 Sheets-Sheet 2

INVENTOR
ANTONIO BOSCHI,

BY *Stone, Boyden + Mack*
ATTORNEYS.

United States Patent Office 2,708,352
Patented May 17, 1955

2,708,352

REGULATION OF THE PRECOMPRESSION ON TRANSMISSION JOINTS WITH ELASTIC RUBBER ELEMENTS

Antonio Boschi, Milan, Italy, assignor to Società Applicazioni Gomma Antivibranti, Milan, Italy Application August 27, 1951, Serial No. 243,905

Claims priority, application Italy September 30, 1950

2 Claims. (Cl. 64—14)

This invention pertains to flexible torque-transmitting joints between driving and driven rotating members in which elastic elements, in the form of rubber blocks or segments, are employed to transmit the tangential force of rotation from the driving to the driven member. The invention more particularly has reference to flexible torque-transmitting joints of the type disclosed in Italian Patent No. 439,462, issued February 20, 1948, and the copending but now abandoned U. S. application, Serial No. 75,002, filed February 7, 1949, in the names of Antonio Boschi and Adolfo Andanti, of which this application is a continuation in part.

As disclosed in that application, Serial No. 75,002, the elastic elements are mounted in the flexible torque-transmitting joint, either with or without precompression in the direction of the axes of the said individual elements, and the ultimate compression of said elements serves the dual purpose of improving the working conditions of the bonds between each rubber element and its contacting metal parts, as well as regulating at will the torsional rigidity of the joint without impairing its axial and Cardanic flexibility.

An object of this invention is to provide improved means to better regulate the precompression of the rubber elements of a flexible torque-transmitting joint, so as to obtain uniformity in the stresses of the component fibres of said rubber elements due to such precompression.

Another object of this invention is to provide improved means for precompressing the rubber elements of a flexible torque-transmitting joint, wherein the outermost fibres of each rubber element, farthest from the center of rotation center of the joint, are axially precompressed, and thus stressed, to a proportionately greater extent than the innermost fibres of said elements, so as to compensate the effect on said elements of centrifugal force resulting from the rotation of the joint, especially at high angular velocities.

Still another object is to provide improved means for regulating the precompression of the rubber elements of a flexible torque-transmitting joint, wherein each of said elements is axially precompressed (and thus stressed) in two successive stages, in the first of which, the outer fibres of said elements are subjected to a higher percentage of precompression than the inner fibres, and in the second stage, all of the fibres of each of said element are precompressed to the same linear extent; for the purposes stated in the preceding objects of this invention.

With these and other objects in view which may be incident to my improvements, my invention consists of the combination and arrangement of elements and steps hereinafter described and illustrated in the accompanying darwings, in which.

Figure 3:
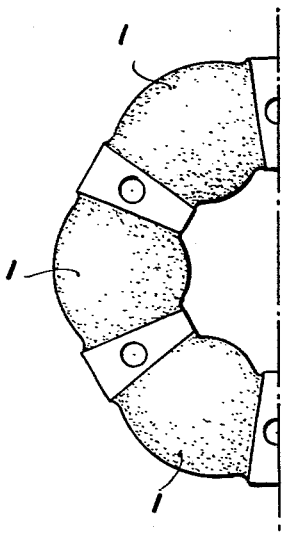
Fig. 3 is a half side elevation of a modified form of flexible torque-transmitting joint, wherein the rubber elements are in the form of circular rim segments and are joined to each other by interposed wedge-shaped, rigid metal blocks.
Figure 2:
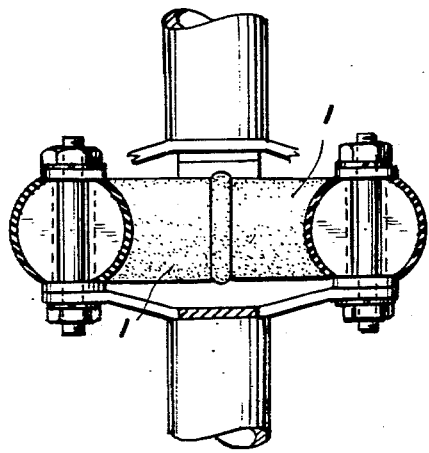
Fig. 2 is a plan view (partly in section) of the joint shown in Fig. 1.
Figure 4:
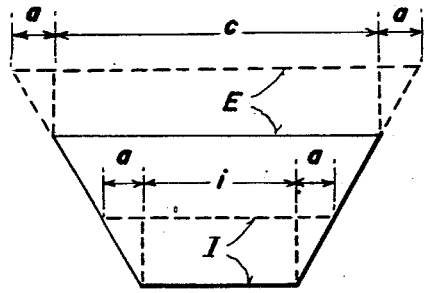
Fig. 4 is a side elevation of one of the rubber elements shown in Fig. 1; the broken (dash) lines indicating the uncompressed shape and dimensions of the element, and the full lines indicating its shape and dimensions after a single precompression by the same amount in absolute value for all the longitudinal fibres, as in the prior art.
Figure 5:
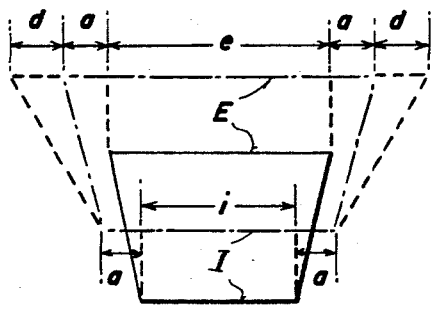
Figure 6:
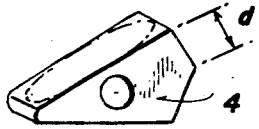

Fig. 5 is similar to Fig. 4; the broken (dash) lines indicating the uncompressed shape and dimensions of the element, the dot-dash lines indicating its shape and dimensions after preliminary precompression with a load proportional to the original length of the fibres, and the full lines indicating its shape and dimensions after further precompression by an equal amount (in absolute value) of all the fibres;

Fig. 6 is an isometric view of one of the metal blocks shown in Fig. 3; and

Figure 7:
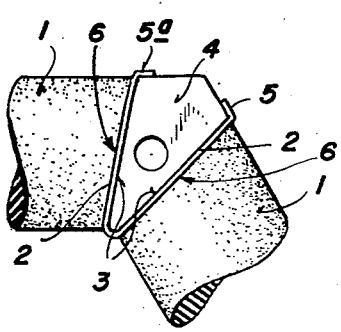

Fig. 7 is a fragmentary side elevation of a flexible torque transmitting joint showing how the blocks of Fig. 6 are mounted between an adjacent pair of rubber elements.

Figure 1:
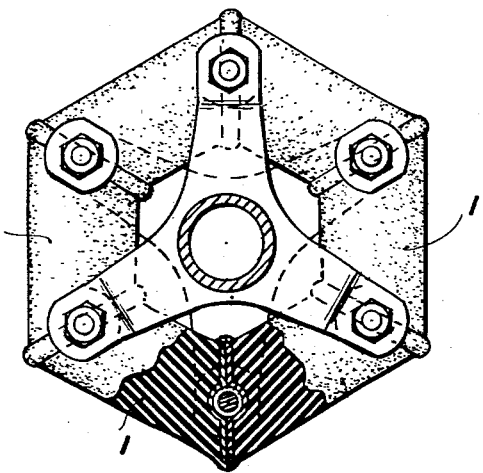
Fig. 1 shows a side elevation partly in section of a flexible torque-transmitting joint, of the polygonal type, with cylindrical rubber elements, as disclosed in said earlier application, cited hereinabove.

When the rubber elements of a flexible torque-transmitting joint, as shown in Figs. 1 or 3, are precompressed so as to reduce the axial length of each element, the outermost fibres of each element (E-fibres of Fig. 4) are subjected to a lower percentage of precompression than the innermost fibres (I-fibres of Fig. 4), owing to the fact the fibres of each element increase in length in proportion to their distance from the rotation center of the joint, and are precompressed by the same amount in absolute value, as indicated by the dimension ($a$) in Fig. 4. This disproportionate shortening and stressing of the fibres of the rubber elements in my invention is eliminated by subjecting said elements to precompression in two stages, as described hereinbelow.

In accordance with my invention, the first stage (initial) precompression is not equal, quantitatively, for all the fibres, but varies proportionately from zero for the innermost fibres, to a value equal to ($2d$) for the outermost fibres, as indicated by the difference between the broken (dash) lines and the dot-dash lines in Fig. 5. This initial precompression can be given with various means, a particularly simple one of which will now be described.

Referring to Fig. 7, the reference numeral 1 denotes a pair of adjacent rubber elements, similar to those shown in Fig. 1, which are connected to each other by the metal part 2 which has two diverging arms of substantially equal length extending from a common angle and to each of which arms a rubber element 1 is bonded. In the form shown in Fig. 7, the arms of the metal part 2 are joined together at their inner edges so as to form a resilient clip into which a wedge-shaped metal block 4 is inserted and held in the position shown in Fig. 7 by flanges 5 and 5–$a$ on the outer edges of the arms of part 2. During the assembly of the flexible torque-transmitting joint and before the block 4 is inserted between the arms of part 2, their adjacent surfaces 3 are almost in contact with each other. Upon the insertion of the block 4 between the arms the latter are spread and held apart by said block as shown in Fig. 7, which imparts to the rubber elements 1 an initial axial precompression, as indicated by the dot-dash lines of Fig. 5. It will be noted from Fig. 5, that the value of this initial precompression varies from zero for the innermost fibres to a maximum of ($2d$) for the outermost fibres. During the further assembly of the joint, an additional (second stage) precompression in a longitudinal direction is then imparted to each rubber element, by thrusting each block and clip assembly radially inward toward the center of rotation of the flexible joint and fixing it in said inward position, which reduces all of the fibres of each rubber element by the same absolute amount, as indicated by the dimensions (2a) in Fig. 4.

The dimension (d) of block 4 (Figs. 5 and 6) is generally determined in such a way that the ratio $$\frac{a+d}{a} = \frac{e}{i}$$

of the dimensions shown in Fig. 5 is maintained. While it is not essential in actual practice that this ratio be absolutely mantained, nevertheless, all the systems, which impart to the outer fibres an initial stress that (in absolute value) is somewhat greater than that imparted to the inner fibres of each rubber element, are favorable to improved working uniformity of the fibres and fall within the scope of my invention. The greater precompression of the outer fibres over the inner ones also serves to solve the second object of my invention, to compensate for the effect on the rubber elements of centrifugal force resulting from the rotation of the joint.

When flexible joints, such as those shown in Figs. 1 and 3 are used in transmissions rotating at high angular velocities, each rubber element acts as a beam, fixed at both ends, which is subjected to a centrifugal force proportional to the weight of the element and the square of its angular velocity. This force acts as a load at the center of the span of the beam and increases in proportion to the distance of the element from the rotation center of the flexible joint. Under such conditions, the rubber elements tend to bend outwardly, so that they may no longer work as columns in axial alignment with the tangential compressive forces imparted to them in transmitting torque.

In order to compensate for this tendency to outward bending (which is reducible to a bending moment, M1), I apply an equal bending moment, M2, in the opposite direction, which is obtained by an increased precompression of the outer fibres of the rubber element, as compared to the inner fibres. To this end, I mount the rubber elements in the joint in such a way that the precompression dimension (d) of Fig. 5 is in accordance with the ratio $$\frac{a+d}{a} = k\frac{e}{i}$$

where (k) is a coefficient greater than 1 and so fixed that the reaction of the external (E) fibres of each pad becomes greater than the internal (I) fibres and thus creates a couple (M2) tending to turn each rubber element around its central points 6 (in Fig. 7) towards the rotation center of the joint. This couple is a function of (k) in the equation $M2 = f(k)$. In order to neutralize the bending moment, M1, due to centrifugal force, it is necessary that $M1 = M2 = f(k)$, and since M1 is known, the dimension (d) of Fig. 5 can be determined.

In view of what has been shown above, it is clear that both of the principal objects of my invention are achieved by a variable increase of the precompression of the rubber elements by an amount which varies from zero for the internal (I) fibres to a maximum of (2d) for the external fibres (E), and it is to be understood that all precompression systems which impart to the external (E) fibres an initial stress greater in absolute value than that imparted to the internal (I) fibres come within the scope of my invention.

While I have shown and described the preferred embodiment of my invention, I desire it to be understood that I do not limit myself to the precise details disclosed by way of illustration, as these may be changed or modified by those skilled in the art without departing from the spirit of my invention or exceeding the scope of the appended claims.

I claim:

1. A flexible joint for transmitting torque from a rotating driving member to a rotating driven member, said members having axially extending arms, the arms of one member being interposed between the arms of the other member and rubber elements secured to and extending between adjacent arms, the radially outermost fibres of the said elements being under an initial degree of compression greater than that of the radially innermost fibres whereby at a given rotational speed the bending produced by centrifugal force will cause the stress in the rubber elements to become uniform throughout the cross-section thereof.

2. A flexible joint for transmitting torque from a rotatable driving member to a rotatable driven member, said members having alternately arranged extension members, a plurality of rubber elements arranged in substantially annular form, said elements extending from an extension member on the driving member to the adjacent extension member on the driven member, the rubber elements being placed under compression lengthwise thereof during assembly of the joint, so that the successive layers of the rubber elements from the layer closest to the center of rotation of the joint to the farthest layer thereof, are under progressively greater degrees of compression.

References Cited in the file of this patent

UNITED STATES PATENTS

| Number | Name | Date |
|---|---|---|
| 2,122,838 | Guy | July 5, 1938 |
| 2,127,942 | Schmidt | Aug. 23, 1938 |

FOREIGN PATENTS

| Number | Country | Date |
|---|---|---|
| 377,454 | Great Britain | 1932 |